United States Patent
Kameyama

(10) Patent No.: US 8,325,246 B2
(45) Date of Patent: Dec. 4, 2012

(54) IMAGING APPARATUS AND IMAGING METHOD CAPABLE OF IMAGING AT A LOW FRAME RATE

(75) Inventor: Takashi Kameyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 653 days.

(21) Appl. No.: 12/099,362

(22) Filed: Apr. 8, 2008

(65) Prior Publication Data

US 2008/0252741 A1  Oct. 16, 2008

(30) Foreign Application Priority Data

Apr. 10, 2007  (JP) ................ P2007-103242

(51) Int. Cl.
*H04N 5/228* (2006.01)
*H04N 5/202* (2006.01)

(52) U.S. Cl. ............... 348/222.1; 348/229.1; 348/254; 348/255

(58) Field of Classification Search ............ 348/222.1, 348/254, E5.031, 229.1, 230.1, 255, 294, 348/296, 297, 362–366
See application file for complete search history.

(56) References Cited

U.S. PATENT DOCUMENTS

| 5,745,808 | A | 4/1998 | Tintera |
| 6,693,673 | B1 | 2/2004 | Tanaka et al. |
| 2003/0001975 | A1* | 1/2003 | Takeda et al. ........... 348/678 |
| 2004/0160525 | A1* | 8/2004 | Kingetsu et al. ......... 348/364 |
| 2005/0046701 | A1* | 3/2005 | Kaneko et al. ......... 348/222.1 |
| 2005/0162529 | A1* | 7/2005 | Nakasuji et al. ........ 348/222.1 |

FOREIGN PATENT DOCUMENTS

| EP | 1 471 733 | 10/2004 |
| JP | 5-191717 | 7/1993 |
| JP | 6-38097 | 2/1994 |
| JP | 2005 39710 | 2/2005 |

* cited by examiner

*Primary Examiner* — Ngoc-Yen Vu
*Assistant Examiner* — Akshay Trehan
(74) *Attorney, Agent, or Firm* — Frommer Lawrence & Haug LLP; William S. Frommer

(57) ABSTRACT

An imaging method is provided. The method includes the steps of: amplifying an imaging signal obtained from an image sensor for converting imaging light into an imaging signal; carrying out nonlinear processing on the amplified signal; adding a predetermined plurality of frames of the imaging signal subjected to the nonlinear processing per frame; and carrying out the variable setting of amplification gain of each frame on the basis of a signal accumulation period of each frame in the plurality of frames subjected to the addition.

6 Claims, 7 Drawing Sheets

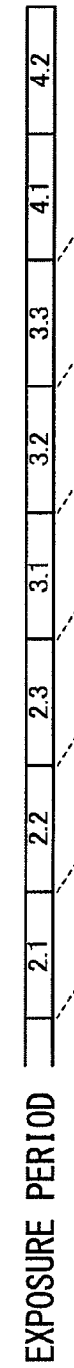
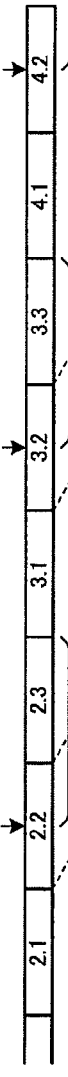
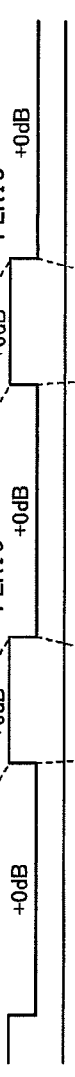

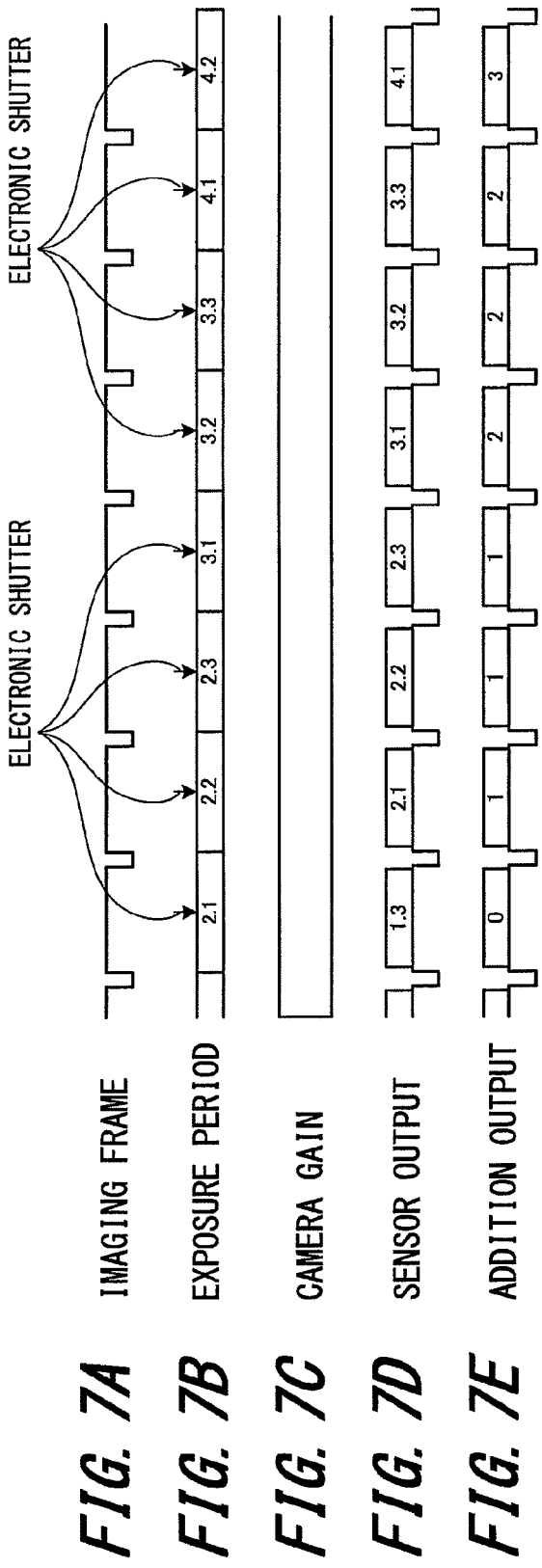

IMAGING APPARATUS AND IMAGING METHOD CAPABLE OF IMAGING AT A LOW FRAME RATE

CROSS REFERENCE TO RELATED APPLICATIONS

The present invention contains subject matter related to Japanese Patent Application 2007-103242 filed in the Japanese Patent Office on Apr. 10, 2007, the entire contents of which being incorporated herein by reference.

BACKGROUND OF THE INVENTION

1. Field of the Invention

The invention relates to an imaging apparatus that is applied to a video camera capable of imaging at a low frame rate and to an imaging method that is applied to the imaging apparatus.

2. Description of the Related Art

A video camera, which obtains video signals conforming to a television broadcasting format or the like, employs a specified frame rate of 1/60 second, 1/50 second, or the like for capturing an image with an imager. For example, a video camera with a frame rate of 1/60 second has the maximum period (or shutter period) of 1/60 second for accumulating imaging light received with an imager for each frame.

When processing of shortening a period of receiving imaging light within one frame period (or electronic shutter processing) is carried out, an image can be captured at a high shutter speed of 1/100 second, 1/1000 second, or the like. In this case, however, allowing a period of receiving imaging light to be longer than one frame period (or a low shutter speed) may not be carried out.

For realizing imaging at a frame rate lower than the defined frame rate, imaging light for a long period over a plurality of frame periods can be received by an imager and a signal received for the plurality of frame periods can be then read out of the imager. For example, when a CCD (charge coupling device) image sensor is used as an imager, a period at which charges are accumulated in each pixel by light received can be extended. For example, when the electron-accumulation period for each pixel corresponds to the sum of two frame periods (1/30 second), a signal accumulated within 1/30 second can be read out. Thus, low-rate imaging with twice the accumulation period can be attained. The imaging signals thus obtained may be intermittently changed every 1/30 second that is twice the general frame period, when the normal frame period is set to 1/60 second. For example, an image can be captured even in darkness, such as night. In this way, by carrying out the imaging and recording at a frame rate lower than that of replay, a rapid-running effect can be obtained. In the above description, an example of processing of accumulating charged for twice the frame period has been explained. The period of accumulating electrons in the imager may be adjusted, for example, to allow the imaging to be extended for a period of several tens of frames.

Japanese Unexamined Patent Application Publication No. 2005-39710 discloses an example of an imaging apparatus that carries out processing of varying frame rates by frame addition.

SUMMARY OF THE INVENTION

However, if the period of electron accumulation in a light-receiving element of the image sensor is extended as described above, a dynamic range of the correcting function of the image sensor is caused to be insufficient. Thus, the resulting image may expose a fixed pattern noise of the image sensor or an automatic control system, such as a white balance adjustment, will be not enough for practical use due to intermittent images. As a result, degradation in image quality may occur extensively.

For example, the output from the image sensor may be subjected to digital synchronized addition at the stage in which an imaging signal output from the image sensor is a linear signal. Here, the phrase "the stage in which an imaging signal output from the image sensor is a linear signal" means the stage of a signal on which the output of the image sensor before subjecting to various kinds of imaging-signal processing, such as white-balance adjustment and gamma correction, is directly reflected.

In the case where the outputs of the image sensor are added in the stage subsequent to a nonlinear signal processing circuit, characteristic of the signal after the addition may deteriorate if the characteristics of signal of the respective frames added vary, when the addition is carried out.

For example, if the addition of two frame periods is carried out, each of the two frame periods may be of all the same charge accumulation period. However, in fact, the signal charge accumulation period of the image sensor may be shortened in one frame period in the processing referred to as electronic shuttering. If the signal accumulation periods of two added frame periods vary due to the electronic shuttering processing, signal characteristics of the added respective frame periods are not always equal when the outputs from the image sensor are added. Thus, the signal after the addition may have deteriorating characteristics.

The invention addresses the above-identified, and other problems associated with conventional methods and apparatuses. It is desirable to provide an imaging apparatus and an imaging method in which imaging at a low frame rate and electron shuttering are suitably combined.

According to an embodiment of the invention, there is provided an imaging apparatus and according to another embodiment of the invention, there is provided an imaging method. An imaging signal obtained from an image sensor for converting imaging light into the imaging signal is amplified. A predetermined plurality of frames of the amplified imaging signal are added per frame. Subsequently, amplification gain of each frame is variably set depending on a signal accumulation period of each frame in the plurality of frames to be added.

According to the processing as described above, a signal of each frame to be added has a gain that is variably set on the basis of the signal accumulation period when the addition of the plurality of frames of the imaging signal is carried out for imaging at a low frame rate.

According to the embodiments of the invention, a signal of each frame to be added has a gain that is variably set on the basis of the signal accumulation period when the addition of the plurality of frames of the imaging signals is carried out for imaging at a low frame rate. Thus, the characteristics of signal before the addition can be equalized, so that the characteristics of signal can be prevented from being deteriorated by the addition.

BRIEF DESCRIPTION OF THE DRAWINGS

FIGS. 3A to 3D are timing charts illustrating an example of imaging timing (three-frame addition) in an imaging apparatus in accordance with the embodiment of the invention.

FIGS. 4A to 4E are timing charts illustrating an example of imaging timing (three-frame addition) in an imaging apparatus when electronic shuttering is carried out in accordance with the embodiment of the invention.

FIGS. 6A, 6B, 6C, and 6D represent different shutter apertures of 100%, 75%, 50%, and 25%, respectively.

FIGS. 7A to 7E are timing charts illustrating another setting example of electronic shuttering and gain in an imaging apparatus in accordance with the embodiment of the invention.

DESCRIPTION OF THE PREFERRED EMBODIMENTS

Hereinafter, examples of one embodiment of the invention will be described with reference to the attached drawings.

Figure 1:
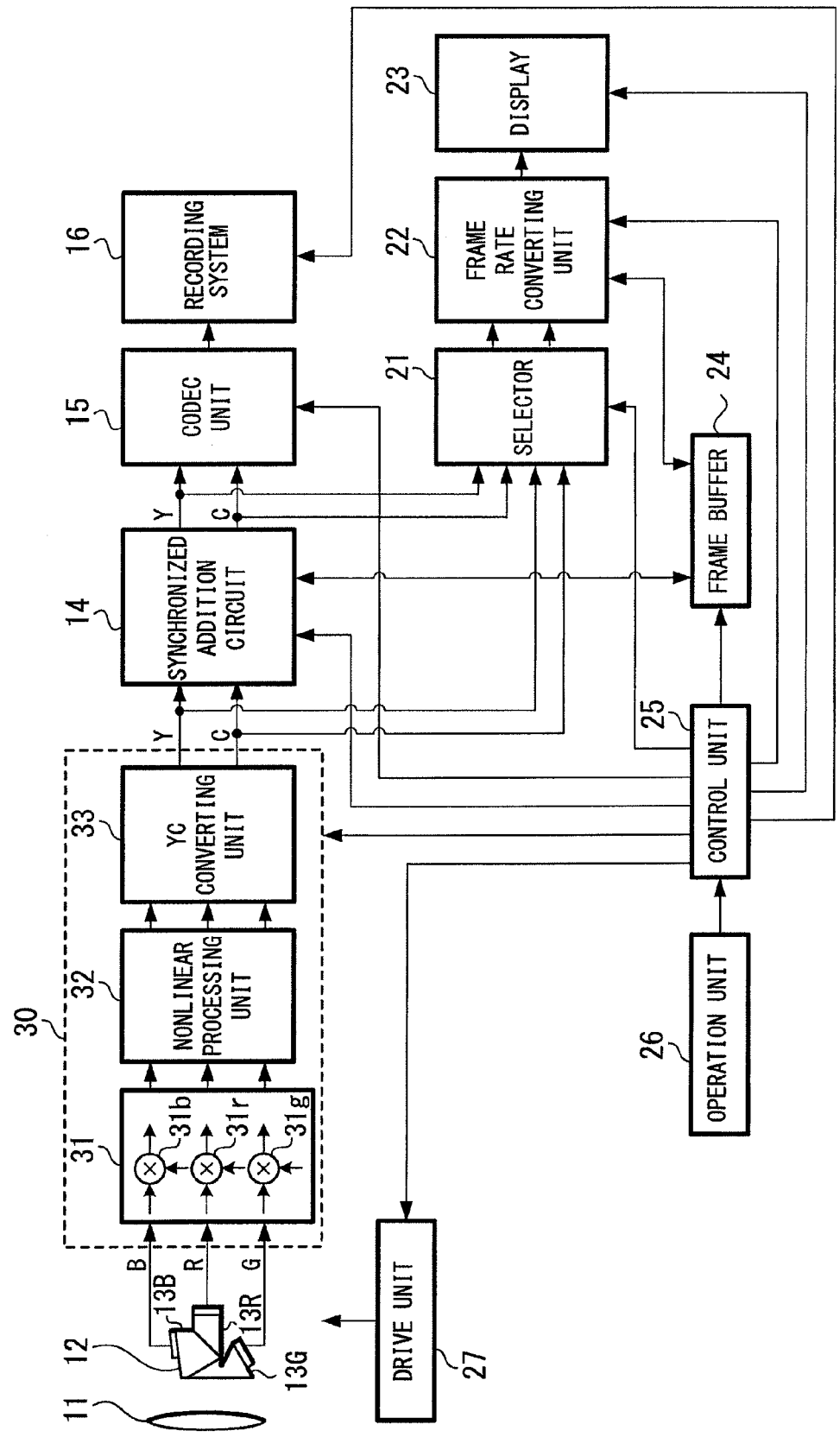
FIG. 1 is a block diagram illustrating an example of configuration of an imaging apparatus in accordance with an embodiment of the invention.

FIG. 1 is a block diagram illustrating an exemplified configuration of an imaging apparatus as an example of the embodiment of the invention. Referring now to FIG. 1, the configuration of the imaging apparatus will be described. Imaging light obtained through a lens 11 is separated into three primary colors by a prism 12. The separated imaging light rays of the respective colors are incident on the imaging surfaces of blue, green, and red image sensors 13B, 13G, and 13R, respectively. The imaging light rays forming images on the imaging surfaces of the respective color image sensors 13B, 13G, and 13R are converted into electric signals in the respective image sensors 13B, 13G, and 13R, followed by reading out converted electric signals, respectively. The electric signals read out of the image sensors 13B, 13G, and 13R are referred to as imaging signals, respectively.

For simplifying the description, the lens 11 is represented as a single lens in FIG. 1. In actual, however, the lens 11 may include a plurality of lenses (lens groups) and may act as a zoom lens. In addition, but not shown in the figure, an iris, an aperture mechanism, is also arranged in the optical path of the lens 11. The image sensors 13B, 13G, and 13R may be, for example, CCD image sensors or CMOS image sensors. The signal accumulation period of each frame in each of the image sensors 13B, 13G, and 13R is subjected to variable setting by an instruction from a later-described control unit 25. In order words, for example, if one frame is 1/60 second, then the maximum signal accumulation period of the one frame period is approximately 1/60 second but an accumulation period shorter than the former may be defined. In this way, the processing of shortening the signal accumulation period in one frame period is referred to as electronic shuttering.

The imaging signals read out of the image sensors 13B, 13G, and 13R are supplied to a camera processing unit 30. Subsequently, the imaging signals are subjected to various kinds of correction processing in the camera processing unit 30. The correction procedures include correction with linear-signal processing and nonlinear-signal processing.

The imaging signals input in the camera processing unit 30 are first supplied to a linear processing unit 31 and then subjected to linear signal processing. The linear signal processing in the linear processing unit 31 individually carries out amplification processing in amplification circuits 31$b$, 31$g$, and 31$r$ for the respective color imaging signals to obtain the respective color imaging signals with appropriate levels as shown in FIG. 1. In the present embodiment, gains set by the respective amplification circuits 31$b$, 31$g$, and 31$r$ are corrected depending on the difference of signal accumulation periods in respective frames in a mode of carrying out the later-described frame addition (imaging mode at a low frame rate). An example of the gain setting will be described later.

In addition, processing of correcting a white balance adjustment for adjusting the balance of blue, green, and red imaging signals is carried out. The processing of correcting a white balance adjustment may also be carried out in each of the amplification circuits 31$b$, 31$g$, and 31$r$.

The imaging signal processed by the linear processing unit 31 is supplied to a nonlinear processing unit 32, thereby subjecting to nonlinear signal processing.

The correction with the nonlinear signal processing in the nonlinear processing unit 32 may be a gamma (γ) correction, knee correction, or the like. The gamma correction is correction processing in which a luminance value of each color is transformed using nonlinear I/O characteristics on the basis of a gamma correction curve. The knee correction is nonlinear-correction processing in the nonlinear processing unit 32 to adjust the brightness of a bright portion in an image. The nonlinear-correction processing in the nonlinear processing unit 32 is configured as follows: The nonlinear-correction processing when carrying out normal imaging and the nonlinear-correction processing when carrying out frame addition as described below can be defined with different correction characteristics by instructions supplied from the later-described control unit 25, respectively. Furthermore, the correction characteristics may be defined with further correction depending on the number of frames added at the time of the frame addition.

The imaging signal corrected in the nonlinear processing unit 32 is supplied to an YC converting unit 33. Here, the YC converting unit 33 converts the imaging signal formed of blue, green, and red primary color signals (hereinafter, referred to as RGB signals) into imaging signals including a luminance signal (hereinafter, referred to as an Y signal) and a chroma signal (hereinafter, referred to as a C signal). The imaging signal converted by the YC converting unit 33 is output from the camera processing unit 30.

The imaging signals (Y signal and C signal) output from the camera processing unit 30 are supplied to a synchronized addition circuit 14. In addition, the synchronized addition circuit 14 is connected to a frame buffer 24 formed of a frame memory. Imaging signals supplied are subjected to arithmetic addition per frame when the imaging is carried out at a low frame rate. The control unit 25 may control the number of frames added and so on. The imaging signals added in the synchronized addition circuit 14 or the imaging signals without addition are supplied to a codec unit 15.

The codec unit 15 performs codec processing in which imaging signals supplied are converted into a video signal of a predetermined format. Then, the converted video signal is supplied to a recording circuit 16 and then recorded in a recording medium (storage medium). The recording medium suitably used may be any of various media, such as memory cards, optical disks, and magnetic tapes.

Furthermore, an imaging signal output from the camera processing unit 30 and an imaging signal output from the synchronized addition circuit 14 are supplied to a selector 21. Thus, under the control of the control unit 25, the imaging signal to be displayed is selected by the selector 21. For example, the selector 21 selects the imaging signal output from the synchronized addition circuit 14 when displaying the imaging signal obtained at a low frame rate at the time of low-frame rate imaging. On the other hand, the selector 21 selects the output from the camera processing unit 30 when the imaging signal being not added per frame during the low-frame rate imaging is displayed. At the time of normal imaging, there is no difference in the selected imaging signals.

The image signal selected by the selector 21 is subjected to the conversion of frame rate for display or external output by the frame rate converting unit 22, followed by being displayed on the display 23. Alternatively, a video signal converted by the frame rate converting unit 22 may be output from an output terminal (not shown). The conversion in the frame rate converting unit 22 and the display in the display 23 are also carried out under control of the control unit 25. When the conversion of frame rate is carried out by the frame rate converting unit 22, the conversion processing is performed using a frame buffer 24 as a temporary storage device.

The control unit 25, which controls the respective units of the imaging apparatus, receives operation instructions from an operation unit 26 having operation switches and so on. Thus, the operation of the operation unit 26 leads to the control of imaging actions, such as the start or termination of imaging. In addition, the setting of an imaging mode and so on can be performed on the basis of the operation of the operation unit 26. The setting of a low-frame-rate mode and the setting of electronic shuttering are also carried out by the operation of the operation unit 26. Alternatively, the electronic shuttering may be automatically controlled by the control unit 25 depending on the imaging conditions (luminance and so on) at the time. The action of accumulating imaging signals in the frame buffer 24 is also controlled by the control unit 24. Here, the frame buffer 24 is a memory in which an image signal can be stored in the form of a Y signal and a C signal.

Figure 2:
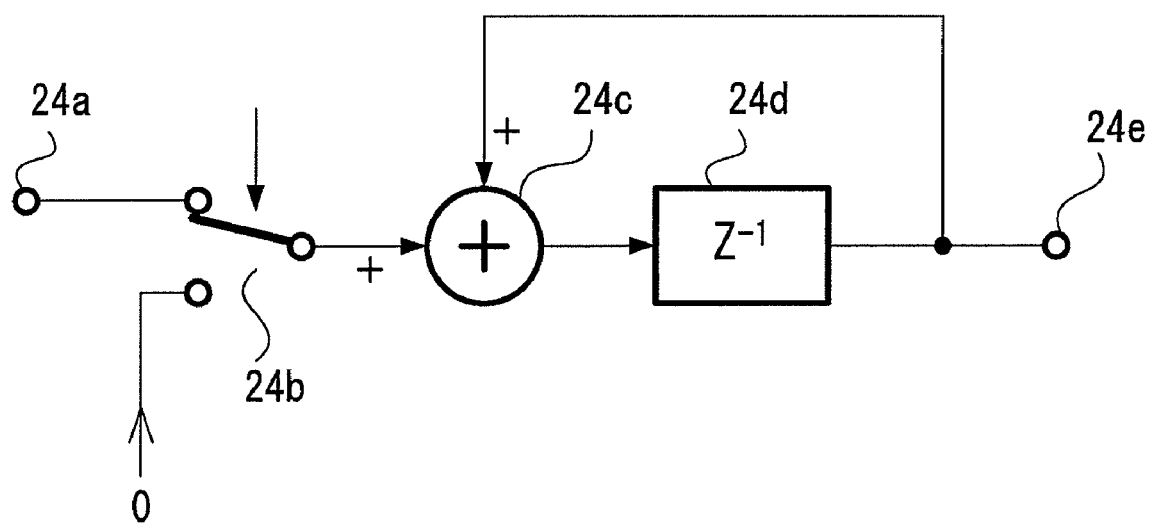
FIG. 2 is a circuit diagram illustrating an example of synchronized addition in the imaging apparatus in accordance with the embodiment of the invention.

Referring now to FIG. 2, the configuration of the synchronized addition circuit will be described when the frame buffer 24 is used as a memory circuit for synchronized addition. An imaging signal input into an input terminal 24a is supplied to an adder 24c through a switching switch 24b. Here, the switching switch 24b selects the terminal where 0 (zero) data is obtained but not the opposite side, the input terminal 24a, during the period without addition of imaging signals. The adder 24c is provided for the addition of outputs from a memory unit 24d. Then, the output of the adder 24c is supplied to and stored in the memory unit 24d. Subsequently, the imaging signal stored in the memory unit 24d is output from an output terminal 24e. In the configuration of the circuit illustrated in FIG. 2, the processing in which the memory unit 24d stores an imaging signal of one frame and the imaging signal stored is added to an input signal in the adder 24c is synchronously carried out on each frame. Thus, a signal for each frame can be added in order. Subsequently, the imaging signal to which a required number of frames are added is output from the output terminal 24e. For carrying out the addition in the frame buffer 24, the position of pixel added in each frame is adjusted so as to be coincident with the pixel other. Thus, such an addition makes the luminance value of each pixel position into the value added in the period corresponding to the number of added frames.

FIGS. 3A to 3D are timing charts illustrating an imaging operation when addition processing is carried out in the synchronized addition circuit 14 of the imaging apparatus of this example. The example shown in FIGS. 3A to 3D is one in which three frames of imaging signal are added. FIG. 3A illustrates the frame cycle of imaging signal. As shown in FIGS. 3B to 3D, imaging signals of three frames during the exposure are added and provided as a signal of one frame. Specifically, as shown in FIG. 3D, outputs from the image sensor during three frame periods with exposure periods 1.1, 1.2, and 1.3 are added together, resulting in an imaging signal of frame number 1 subjected to the three-frame addition in the synchronized addition circuit 14. The imaging signal of frame number 1 is output from the synchronized addition circuit 14 during successive three frame periods. Outputs from the image sensor during three frame periods with the subsequent exposure periods 2.1, 2.2, and 2.3 are added together, resulting in an imaging signal of frame number 2 subjected to the three frame addition in the synchronized addition circuit 14. The imaging signal of frame number 2 is also output from the synchronized addition circuit 14 during three frame periods.

Accordingly, the imaging signal obtained from the addition of three frames leads to the exposure time in the image sensor 13B, 13G, or 13R three times longer than that of the image signal at the time of normal imaging. Thus, the frame rate of the imaging is one-third of the normal imaging.

The example illustrated in FIGS. 3A to 3D has been described as an example of the three-frame addition. However, the number of frames added may be two or more, optionally. For example, if one frame is 1/60 seconds and 60-frame addition is carried out, imaging can be carried out at a low frame rate of every one second.

Referring now to FIGS. 4A to 4B, an example of processing in which the imaging processing at a low frame rate as described above is combined with the electronic shuttering will be described. The example shown in FIGS. 4A to 4B is one in which the imaging at low frame rate is of a frame rate of 1/3 similar to the case shown in FIGS. 3A to 3D.

When the electronic shuttering is not carried out, three frames of imaging signal are added as shown in FIGS. 3A to 3D in a mode of imaging at a frame rate of 1/3. However, when the electronic shuttering is carried out, for example, signal before the timing instructed by the electronic shuttering in the three frame periods to be added are discarded. Signal after the timing instructed by the electronic shuttering is only added.

In the example shown in FIGS. 4A to 4B, an imaging frame cycle is defined as shown in FIG. 4A. In addition, as shown in FIG. 4B, imaging at a low frame rate is defined so that three frame period of the imaging frames is set to one imaging frame period. Here, after the imaging state at a low frame rate is defined, the electronic shuttering in which signal almost after the middle of the second frame period is accumulated (added) while the preceding signal is discarded is assumed to be carried out as shown in FIG. 4B. Specifically, for example, in a mode of imaging at a low frame rate of adding three frame periods of exposure periods 2.1, 2.2, and 2.3, the electronic-shutter timing is set to the timing of almost middle of the exposure period 2.2 and then the period subsequent thereto is only defined as an exposure period. Therefore, in the synchronized addition circuit 14, only the imaging signal in the second half of the exposure period 2.2 and the imaging signal of the whole of the exposure period 2.3 are added.

In the case of such a configuration, a period with a short accumulation period in the electronic shuttering (e.g., exposure period 2.2) changes a signal gain from that of other periods by a linear processing unit in the camera processing unit 30. In other words, when the normal gain of each of amplification circuits 31*b*, 31*g*, and 31*r* in the linear processing unit 31 is 0 dB, the gain in the frame period with almost half the accumulation period is set to 6 dB higher than that of the normal gain. Thus, outputs from the linear processing unit 31 for the imaging signal of the respective frames is almost equal level even in the case of different accumulation periods.

FIG. 4C illustrates an example of setting gain in the amplification circuits 31*b*, 31*g*, and 31*r* of the camera processing unit 30. Signal amplified by such gain is output as shown in FIG. 4D. In this case, as shown in FIG. 4C, the processing in which a frame period having a high gain is provided every three frames is repeated. Gains set in the three amplification circuits 31*b*, 31*g*, and 31*r* are basically the same. However, if the amplification circuits 31*b*, 31*g*, and 31*r* also serve as amplification circuits for white balance or the like, gains may be different among three primary color signals in some cases.

The variable setting of gain is carried out in conjunction with electronic shuttering as shown in FIG. 4C, while the outputs shown in FIG. 4D are added in the synchronized addition circuit 14. As outputs of the synchronized addition circuit 14, the same added signal is repetitively output for three frame periods as shown in FIG. 4E.

Here, in the example shown in FIGS. 4A to 4B, the accumulation period for the frame period in which the signal accumulation period is controlled by the electronic shutter is restricted to approximately ½. Thus, the gain is set to 6 dB higher than other periods. However, the additional level of the gain may vary depending on the degree of restriction in the accumulation period. Specifically, if the accumulation period becomes shorter, the additional level of gain becomes higher. On the other hand, if the accumulation period becomes longer, the additional level of gain becomes smaller. In other words, the accumulation period and the signal gain are in a reverse relation, so that outputs of the linear processing part 31 for the imaging signal of the respective frames are almost equal level even in the case of different accumulation periods. In addition, in the example of FIGS. 4A to 4B, the signal of the first frame period in a three frame cycle (output 2.1 or the like of FIG. 4D) is not added as imaging signal, so that the gain of such a period may be not 0 (zero) dB.

Figure 5:
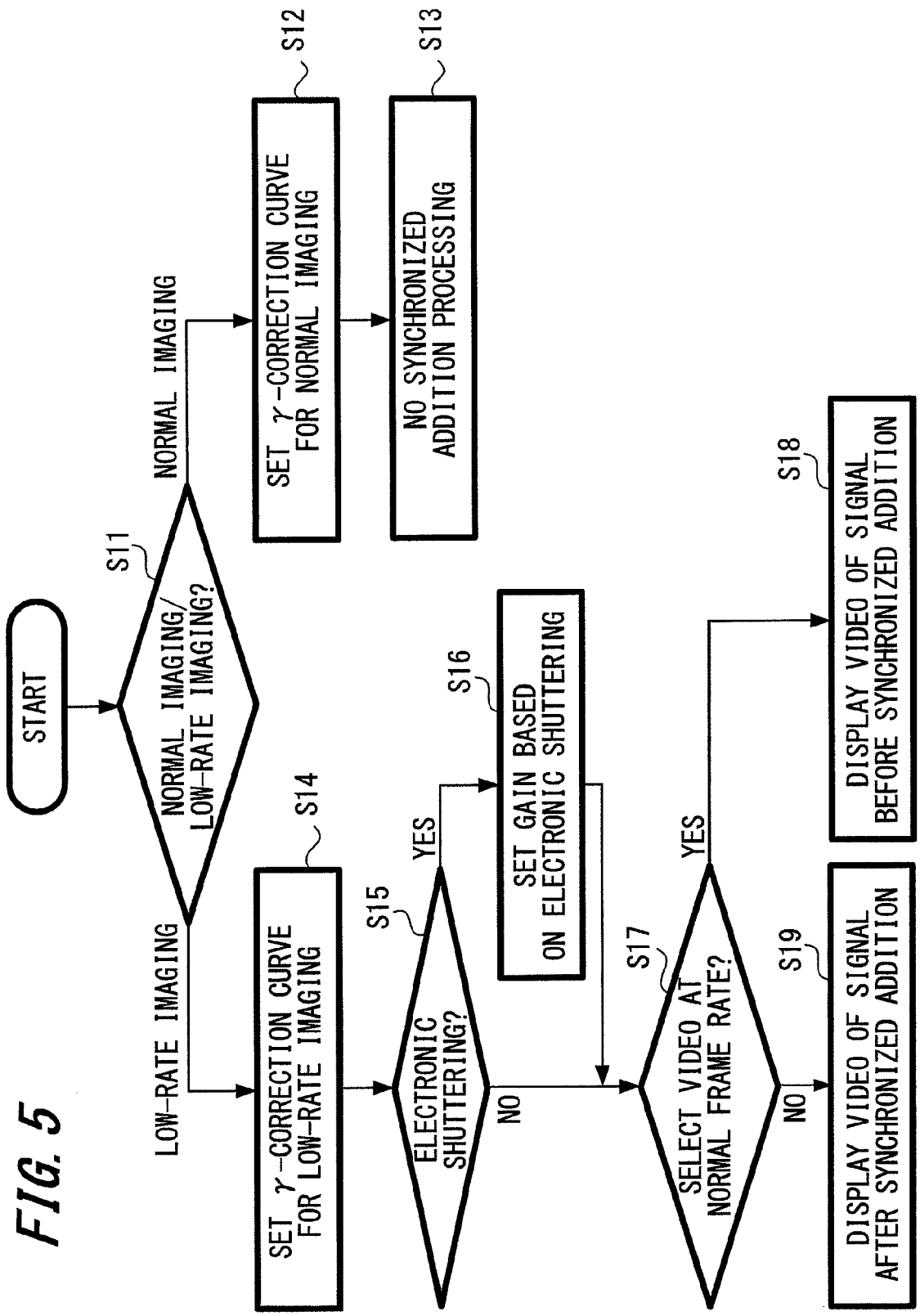
FIG. 5 is a flowchart illustrating an example of processing in an imaging apparatus in accordance with the embodiment of the invention.

Furthermore, FIG. 5 is a flowchart that describes a process example at the time of imaging at a low frame rate carried out by the control action of the control unit 25. First, the control unit 25 determines whether the present imaging mode is imaging at a normal frame rate or imaging at a low frame rate (Step S11). Here, at the time of imaging at a normal frame rate, the nonlinear processing unit 32 defines a gamma correction curve for normal imaging (Step S12), and recording, display, or the like is carried out while no addition processing is carried out in the synchronized addition circuit 14 (Step S13).

In contrast, at the time of imaging at a low frame rate, the nonlinear processing unit 32 defines a gamma correction curve for low-frame-rate imaging (Step S14).

Here, the control unit 25 determines whether the electronic shuttering is carried out or not (Step S15). If the electronic shuttering is carried out, the gain of a frame where a signal accumulation period is restricted by the electronic shuttering is defined so as to be a reverse relation with the signal accumulation period thereof (Step S16). In this way, imaging signal added per frame in the synchronized addition circuit 14 can be obtained.

For displaying video on the display 23, either video at a normal frame rate or video at low-frame-rate processed by frame addition is selected (Step S17). If the video at the normal frame rate is selected, the selector 21 selects the output of the camera processing unit 30 and video based on the selected imaging signal is then displayed on the display 23 (Step S18). When the video at the normal frame rate is desired to be displayed, the video is one being varied with a normal frame rate (i.e., ¹⁄₆₀ second or the like). Thus, the actual imaging state is found and the focus adjustment of a lens, the adjustment of field angle of a zoom lens, and so on can be quickly and correctly carried out. However, it is a video without frame addition, so that the resulting video may be dark in some cases.

Furthermore, if the low-frame-rate video processed by frame addition is selected for display, the selector 21 selects the output after the addition and video based on the selected imaging signal is then displayed on the display 23 (Step S19). At the time of displaying the image captured at a low frame rate, the brightness or SNR of the resulting video can be confirmed as the video is actually taken at a low frame rate. At that time, when the signal accumulation period is restricted by the use of the electronic shuttering, the state of imaging with such electronic shuttering can be checked by display on the display 23.

The example shown in FIGS. 4A to 4B has described the electronic shuttering when the imaging at a low frame rate of ⅓ is carried out. The embodiment of the invention is also applicable to the imaging at another low frame rate.

FIGS. 6A to 6D illustrate examples in which the shutter apertures of the electronic shutter are set to 100% (FIG. 6A), 75% (FIG. 6B), and 25% (FIG. 6D), respectively, when an imaging mode is of imaging at a low frame rate of ½.

Figure 6A:
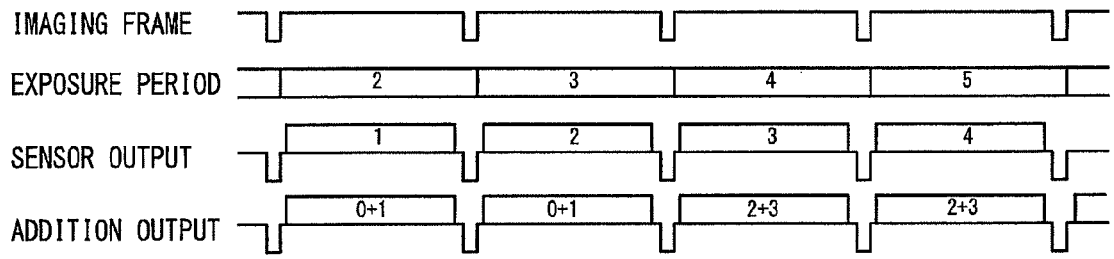
FIGS. 6A to 6D are timing charts illustrating examples of apertures of electronic shuttering and gains in an imaging apparatus in accordance with the embodiment of the invention, where

If the shutter aperture is 100% as shown in FIG. 6A, no restriction with the electronic shuttering exerts on the aperture and the addition processing is carried out such that all of the sensor outputs are amplified with the same gain.

Figure 6B:
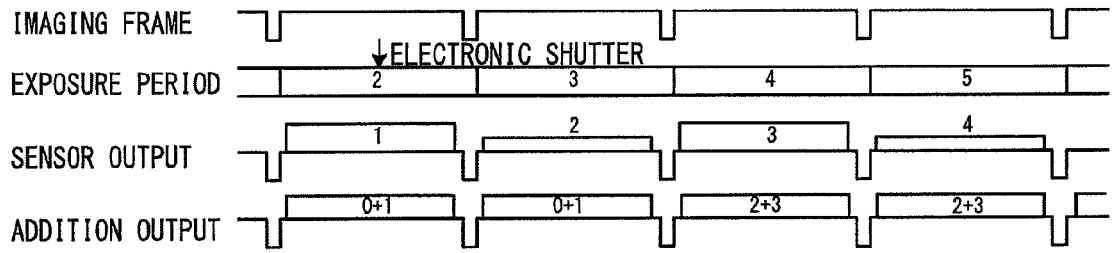

If the shutter aperture is 75% as shown in FIG. 6B, the aperture of the electronic shuttering is being restricted half in one frame period (exposure period 2 or the like). Subsequently, the output of the image sensor from the restricted period is amplified with high gain and then added with signal of the other frame period.

Figure 6C:
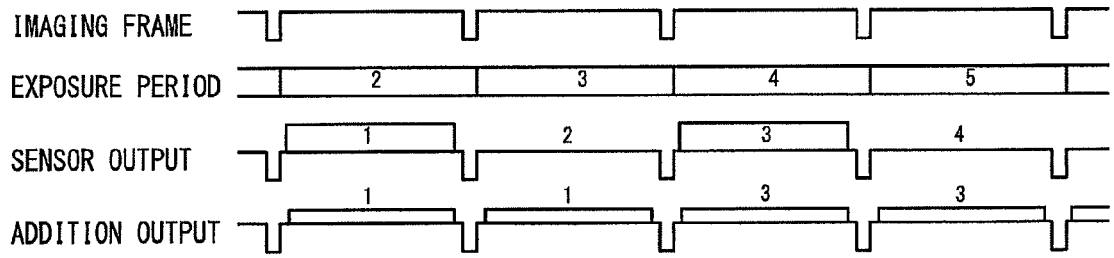

If the shutter aperture is 50% as shown in FIG. 6C, signal of one frame period (exposure period 2 or the like) is not used at all, so that signal of the other frame period is only output without a change in gain.

Figure 6D:
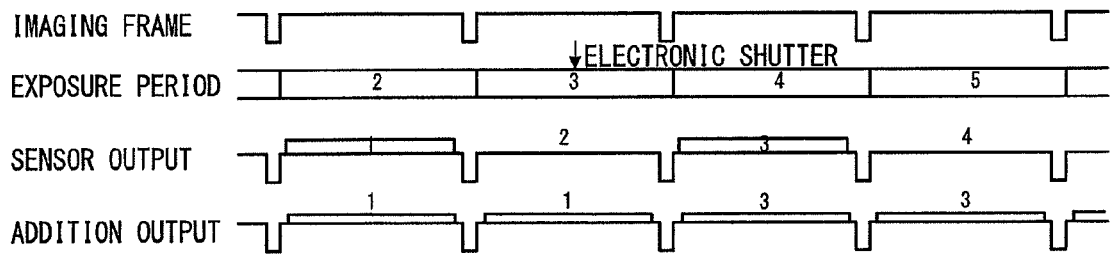

If the shutter aperture is 25% as shown in FIG. 6D, signal of one frame period (exposure period 2 or the like) is not used at all. In addition, the aperture of the electronic shuttering is being restricted half in the other frame period (exposure period 1 or the like). The output of the image sensor from the restricted period is amplified with high gain and then the signal of the other frame period is output.

As described above, the setting of the number of frames added at a low frame rate is combined with variable setting of gain depending on the restriction state of aperture in each frame period by the electronic shutter. Thus, such a combination can correspond to the electronic shuttering in the imaging at any of various low frame rates.

As described above, according to the configuration of the imaging apparatus in accordance with the embodiment of the invention, in the case of combining the imaging at a low frame rate with the electronic shuttering, the process of increasing the gain is carried out in a frame period in which the aperture is restricted by electronic shuttering. As a result, the output levels of the linear processing unit 31 in the camera processing unit 30 are almost equal to each other in any of frame periods. Thus, the nonlinear-correction processing can be suitably carried out in the nonlinear processing unit 32, the subsequent stage of the linear processing unit 31.

In other words, in the nonlinear processing unit 32, the nonlinear-correction processing, such as gamma correction, is carried out. In this case, signal subjected to the nonlinear-correction processing in the nonlinear processing unit 32 has equal characteristic in any of frame cycles, thereby resulting in no disturbance of the state of nonlinear-correction processing of signal subjected to the synchronized addition.

Figure 8:
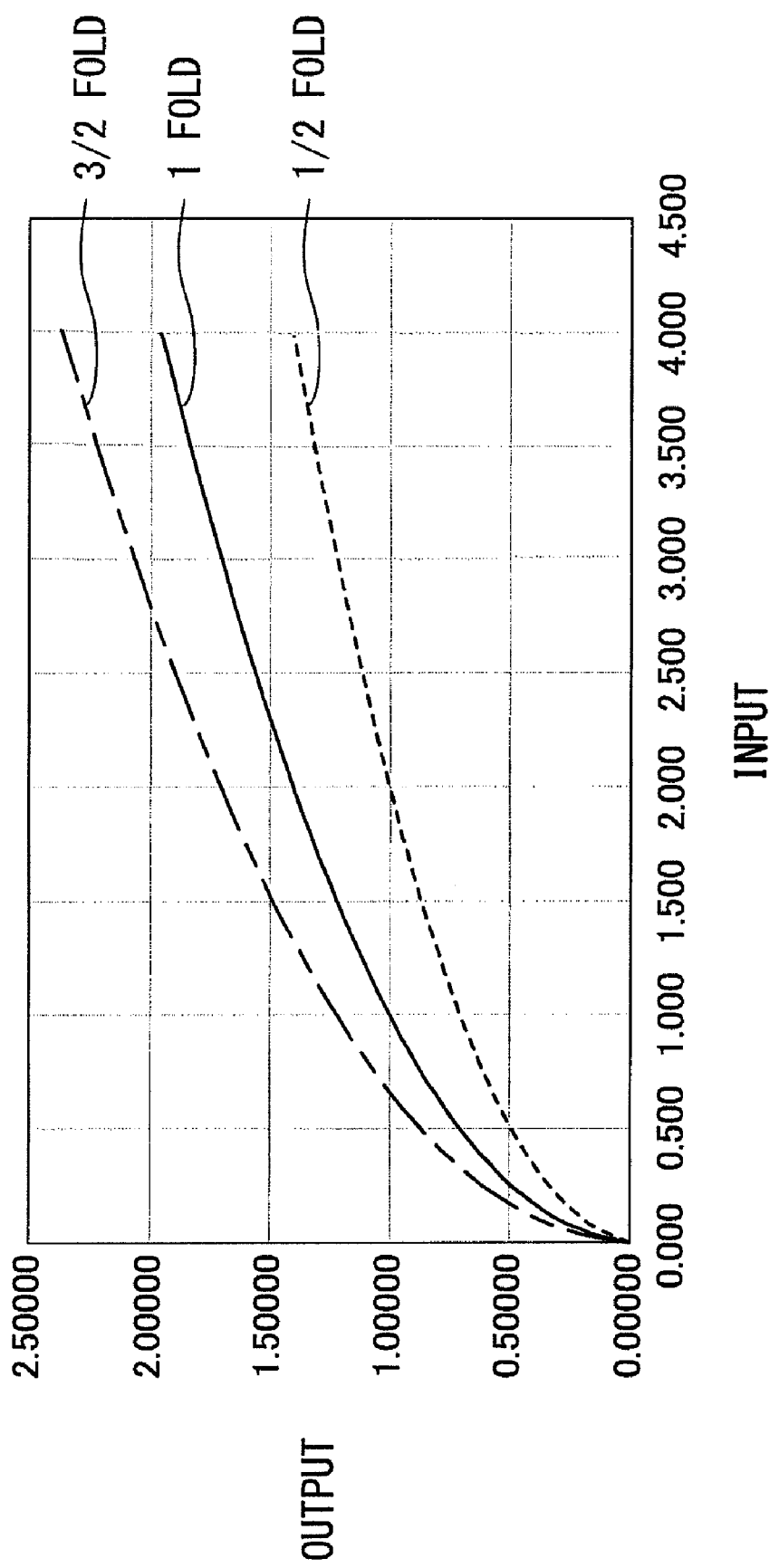
FIG. 8 is a characteristic diagram illustrating gain and gamma curve in an imaging apparatus in accordance with the embodiment of the invention.

With respect to the gamma correction, the gain thereof may be represented by, for example, a curve in which I/O serves as a predetermined characteristic in each case of 1-fold gain, ½-fold gain, and ⅔-fold gain, as shown in FIG. 8. Note that the gain of gamma correction is usually 1-fold.

As shown in FIG. 8, the gamma correction is represented by the curve defined by input level. Thus, if the levels are different in a plurality of added frame periods by electronic shuttering, it is not preferable because signals with different effects of gamma correction can be added. According to the embodiment of the invention, however, the signal levels of the respective frame periods to be added are almost equal to each other even when the electronic shuttering is carried out. Thus, the suitable gamma correction is carried out in a constant state. In the case of any of other nonlinear correction procedures than gamma correction is carried out, suitable characteristics can be obtained according to the embodiment of the invention.

It should be noted that, in the timing-setting examples shown in FIGS. 4A to 4B and FIGS. 6A to 6D, the aperture of only one frame period among a plurality of frames to be subjected to synchronized addition is restricted by the electronic shuttering. However, the aperture of each of the plurality of frames to be subjected to synchronized addition is restricted and the gain may be changed depending on the restricted aperture.

In other words, for example, a mode of imaging at a low frame rate of ⅓ (i.e., the same mode as that of FIGS. 4A to 4B) is selected as shown in FIGS. 7A to 7E. Then, the aperture is restricted to 50% or the like for each of three frame cycles to be added and the gain may be defined depending on the aperture in each of the frame periods. In this case, for example, the processing for increasing the gain 6 dB from the normal level in each frame period is carried out.

Furthermore, in the example described so far, the synchronized addition is designed to be carried out in the form of a luminance signal and a chroma signal. Alternatively, the synchronized addition may be carried out on imaging signals in the form of RGB signals. In addition, signal to be subjected to the synchronized addition is designed to be added per frame. Alternatively, the synchronized addition may be carried out per field.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
   an image sensor for converting imaging light obtained through an optical system into an imaging signal comprised of successive frames of pixels, each such successive frame exhibiting a given frame period;
   an imaging signal processing unit for amplifying the imaging signal obtained from the image sensor;
   a frame addition unit for arithmetically adding the signal levels of corresponding, pixels of a predetermined plurality of frames of the imaging signal processed by the imaging signal processing unit per given frame period to produce an output frame of said given frame period, said output frame containing pixels formed of added signal levels of said corresponding pixels of said given frame period; and
   a control unit for a variable setting of amplification gain of each frame in the imaging signal processing unit on the basis of a signal accumulation period of each frame in the plurality of frames that are added, said accumulation, period and said amplification gain being in a reverse relation, and said signal accumulation period having a range between 0 and one given frame period, by controlling the signal accumulation period in the image sensor.

2. The imaging apparatus according to claim 1, wherein the signal accumulation period is defined by electronic shuttering.

3. The imaging apparatus according to claim 1, wherein gamma correction processing is carried out on the signal amplified in the imaging signal processing unit.

4. The imaging apparatus according to claim 3, wherein gamma correction characteristic in the imaging signal processing unit is changed depending on the number of frames added in the frame addition unit.

5. The imaging apparatus according to claim 1, wherein knee correction processing is carried out on the signal amplified in the imaging signal processing unit.

6. An imaging method comprising the steps of:
   amplifying an imaging signal obtained from an image sensor for converting imaging light into an imaging signal, said imaging signal comprised of successive frames of pixels, each such successive frame exhibiting a given frame period;
   carrying out nonlinear processing on the amplified signal;
   arithmetically adding the signal levels of corresponding pixels of a predetermined plurality of frames of the imaging signal subjected to the nonlinear processing per given frame period to produce an output frame of said given frame period, said output frame containing pixels formed of added signal levels of said corresponding pixels of said given frame period; and
   carrying out the variable setting of amplification gain of each frame on the basis of a signal accumulation period of each frame in the plurality of frames that are added, said accumulation period and said amplification gain being in a reverse relation, and said signal accumulation period having a range between 0 and one given frame period.

* * * * *